Jan. 25, 1955           G. PETERSON           2,700,753

METHOD OF AND APPARATUS FOR SEISMIC PROSPECTING

Filed June 28, 1948           7 Sheets-Sheet 1

*INVENTOR.*
GLEN PETERSON
BY *Hudson & Young*
*ATTORNEYS*

Jan. 25, 1955 G. PETERSON 2,700,753
METHOD OF AND APPARATUS FOR SEISMIC PROSPECTING
Filed June 28, 1948 7 Sheets-Sheet 2

INVENTOR.
GLEN PETERSON
BY Hudson & Young
ATTORNEYS

Jan. 25, 1955        G. PETERSON        2,700,753
METHOD OF AND APPARATUS FOR SEISMIC PROSPECTING
Filed June 28, 1948        7 Sheets-Sheet 3

*INVENTOR.*
GLEN PETERSON
BY *Hudson & Young*
*ATTORNEYS*

Jan. 25, 1955     G. PETERSON     2,700,753
METHOD OF AND APPARATUS FOR SEISMIC PROSPECTING
Filed June 28, 1948     7 Sheets-Sheet 4

INVENTOR.
GLEN PETERSON
BY Hudson & Young
ATTORNEYS

Jan. 25, 1955  G. PETERSON  2,700,753
METHOD OF AND APPARATUS FOR SEISMIC PROSPECTING
Filed June 28, 1948  7 Sheets-Sheet 5

INVENTOR.
GLEN PETERSON
BY Hudson & Young
ATTORNEYS

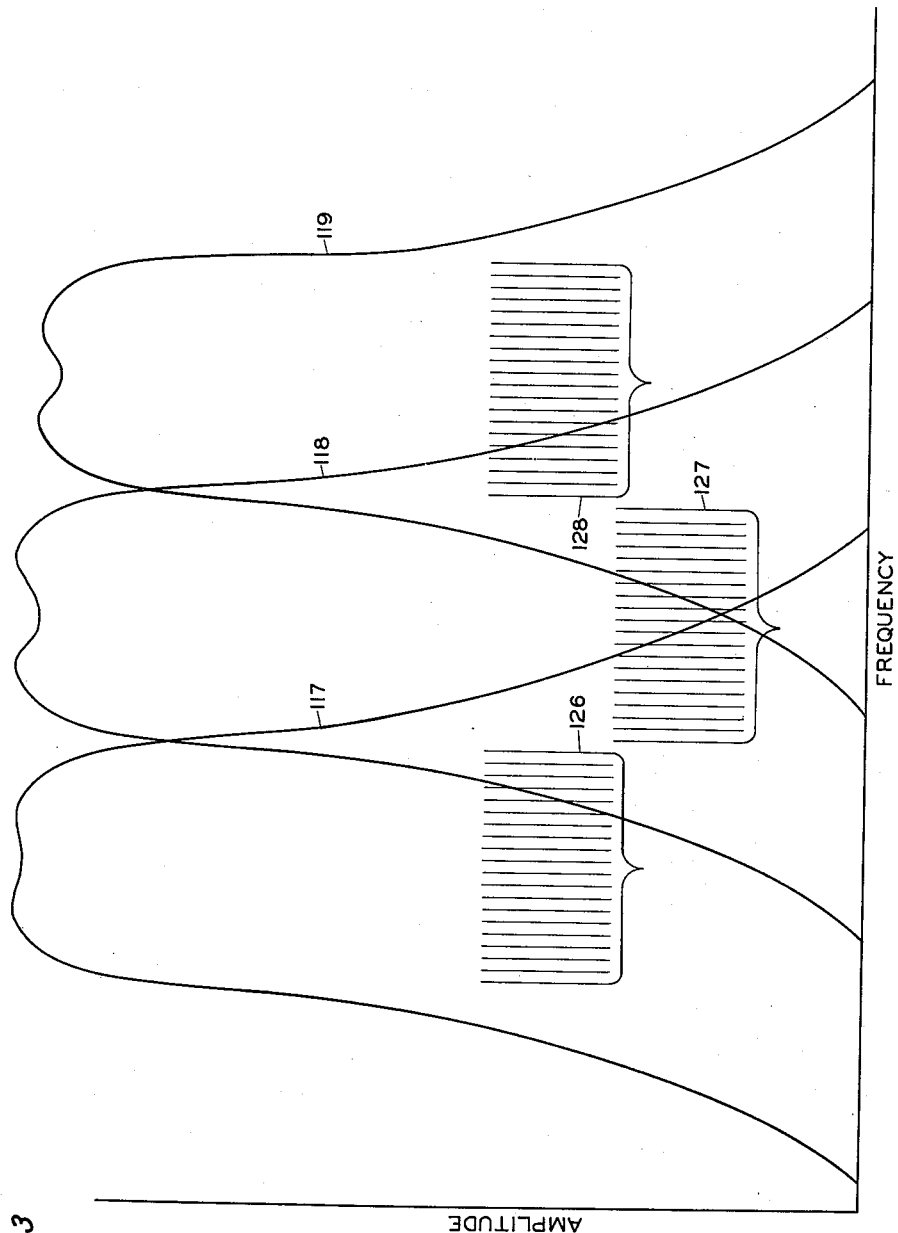

United States Patent Office 2,700,753
Patented Jan. 25, 1955

2,700,753

METHOD OF AND APPARATUS FOR SEISMIC PROSPECTING

Glen Peterson, Tulsa, Okla., assignor to Phillips Petroleum Company, a corporation of Delaware Application June 28, 1948, Serial No. 35,724

16 Claims. (Cl. 340—15)

This invention relates to a radio geophone system. In a more specific aspect, it relates to a multi-channel radio receiving circuit for use in such a system. In a still more specific aspect, it relates to novel mixing and coupling circuits for use in such a multi-channel radio receiving circuit. In a still more specific aspect, it relates to an intermediate frequency coil assembly for use in the novel multi-channel receiving circuit.

Heretofore, in the art of geophysical prospecting, subterranean geological formations have been mapped by firing an explosive charge at a shot point near the surface of the earth and determining, at one or more points remote from the shot point, the time required for the explosion waves to be elastically propagated from the shot point to the points at which the waves are measured. Ordinarily, the earth waves are picked up by geophones and, in previous systems, the geophone stations and the recording vehicle were customarily connected by a long cable. At the recording vehicle, the signals from the geophones were fed to a set of electronic amplifiers and thence to a recorder which furnished an indication of the seismic waves at each geophone station.

It has been recognized that greatly improved results might be obtained if the connecting cables between the geophones and the recording vehicle could be eliminated, as the use of such cables substantially limits the use of the prior art system to relatively accessible and smooth areas, and the cable also provides a definite limit to the distance between the recording vehicle and the various geophone stations, as well as limiting the arrangement of geophones about the point of interest.

It has been previously proposed to replace this cable structure by radio linkages between the shot point, the geophone stations, and the recording vehicles. If this could be accomplished, the relative position of the geophone stations and the recording vehicle would not be limited by the length of the cable but, rather, the geophones could be located at any point within a distance of several miles from the recording vehicle which would substantially increase the flexibility and usefulness of the prospecting equipment.

The radio geophone systems previously proposed have universally failed to provide a workable system on a practical and commercial scale. To a large extent, this has resulted from the difficulties inherent in separating the individual radio waves emanating from each geophone station and separately amplifying them without serious cross talk or distortion. This latter difficulty, particularly phase distortion, results in a shift of the received waves along the time axis, which is particularly undesirable in a geophysical prospecting system where the accurate measurement of time intervals is of prime importance. Similarly, any appreciable cross talk between the respective receiving channels obviously results in substantial inaccuracies in the recorded signals. This difficulty is accentuated by the fact that the transmitters at the respective geophone stations must occupy closely adjacent frequencies to meet commercial and governmental requirements.

It is an object of my invention to substantially eliminate cross talk, and the resulting amplitude and phase distortion in a radio geophone system by the use of novel frequency changing and coupling circuits in a multi-channel radio receiving system.

It is another object of the invention to provide a multi-channel receiving circuit in which a plurality of incoming signals are heterodyned with the output of a single local oscillator thereby to substantially eliminate intermodulation.

It is a further object to provide a radio transmitting and receiving system in which all transmitters are operating at essentially the same level thereby to minimize or eliminate cross-modulation.

It is a further object of the invention to provide novel coupling circuits between the mixer and intermediate frequency amplifiers to reduce the effective plate impedance of the mixer and thereby reduce or eliminate cross-modulation.

It is a still further object of the invention to provide a radio geophone system embodying the previously mentioned mixer and coupling circuits.

It is still another object of the invention to provide a novel intermediate frequency coil unit for use in the aforesaid multi-channel radio receiving circuit.

It is a still further object of the invention to provide a multi-channel receiver embodying a plurality of mixer circuits connected in cascade, each mixer circuit having a set of intermediate frequency amplifiers associated therewith.

Various other objects, advantages and features of the invention will become apparent from the following detailed description and disclosure taken with the appended drawings, in which.

Figure 8:
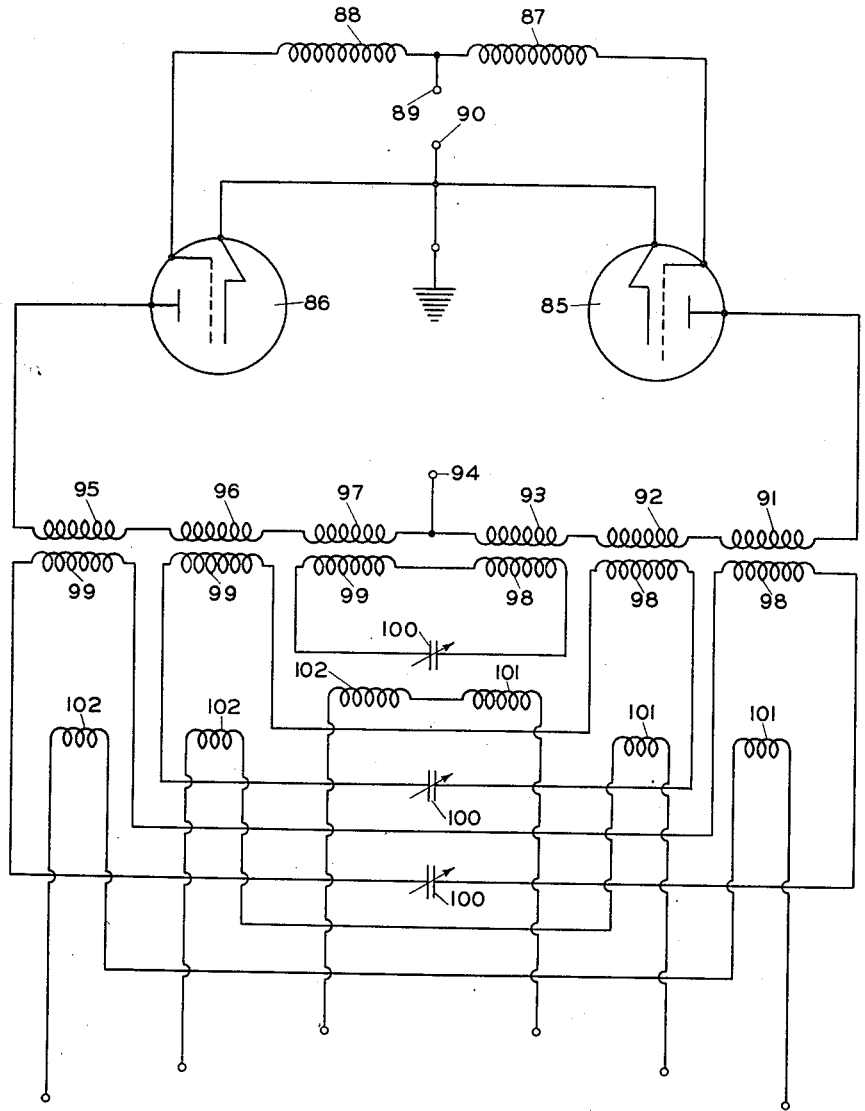
Figure 9:
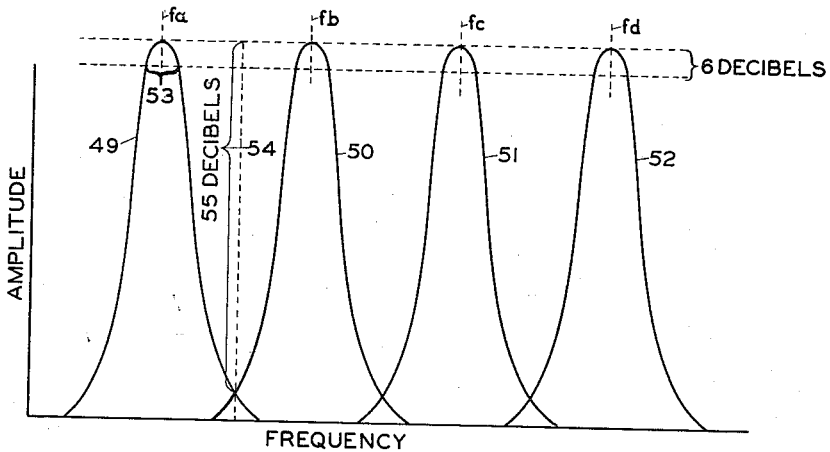
Figure 10:
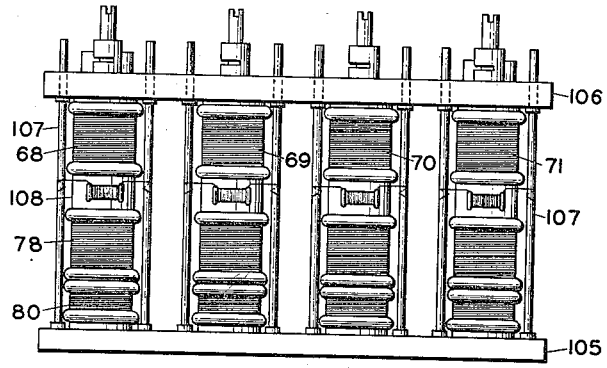
Figure 11:
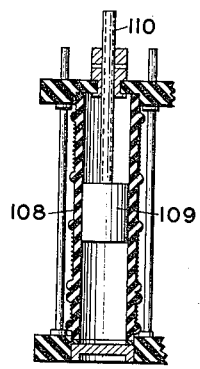
Figure 12:
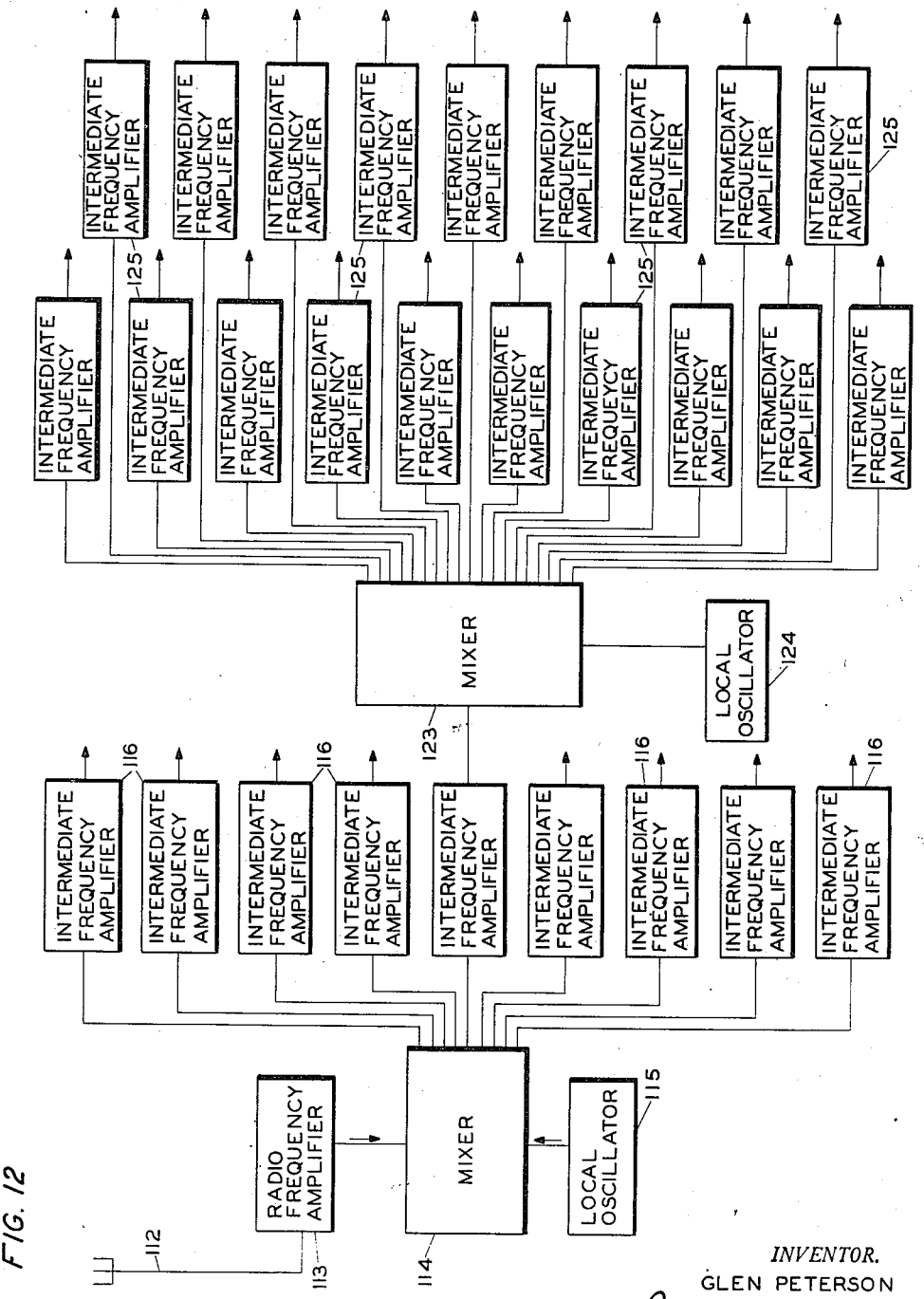

Figures 4 to 7, inclusive, are schematic circuit diagrams illustrating single ended mixer to intermediate frequency amplifier coupling circuits;

Figure 8 is a schematic circuit diagram showing a double ended or push-pull mixing and coupling system;

Figure 9 is a graph showing the selectivity characteristics of the respective intermediate frequency amplifiers;

Figure 10 is a front elevational view of an intermediate frequency coil assembly;

Figure 11 is a sectional view of a portion of the assembly shown by Figure 10;

Figure 12 is a block diagram illustrating a multi-channel receiver utilizing successive mixer stages; and Figure 13 is a graph illustrating the operation of the receiver shown by Figure 12.

Figure 1:
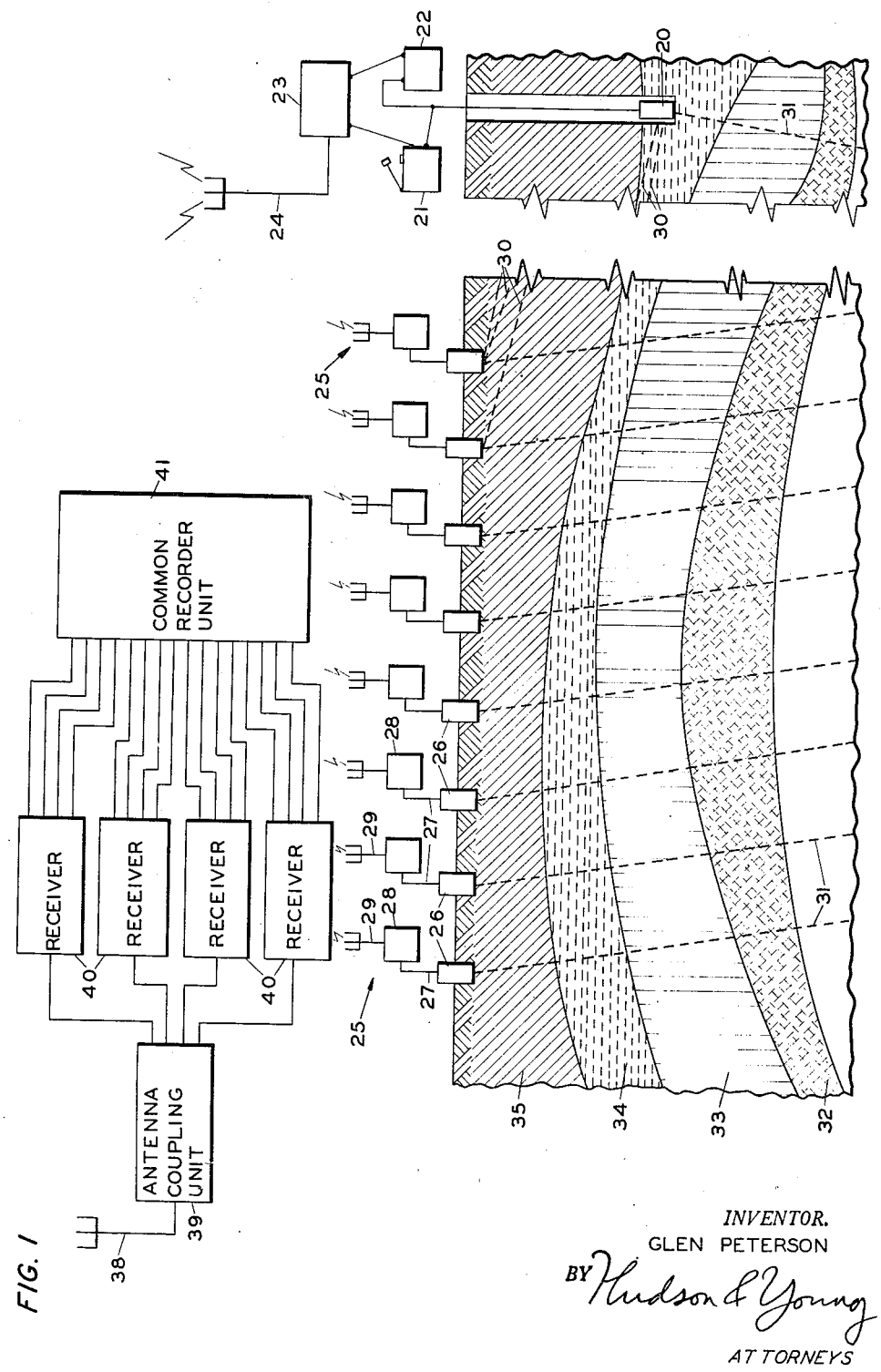
Figure 1 is a block diagram illustrating the complete radio seismograph system.

Referring now to the drawings in detail, a block diagram of the complete system is shown in Figure 1. This system includes a detonator 20 which is preferably buried a short distance below the surface of the earth, the detonator being actuated by firing mechanism 21 which is connected to a battery 22 and a radio transmitter 23 having an antenna 24. The transmitter is preferably but not necessarily of the type disclosed by my copending application Serial No. 41,337, now Patent 2,479,772. The operation of the apparatus at the shot point is to fire detonator 20 when the firing mechanism 21 is actuated, thereby establishing seismic waves which are propagated through the earth. Simultaneously with the firing of the shot, the transmitter 23 is operated and a radio wave is radiated from the antenna 24.

A plurality of geophone stations are provided for measuring the intensity of seismic waves at various points along the surface of the ground, these geophone stations being generally indicated by reference characters 25. At each station, there is a geophone 26 for converting the seismic waves into electrical currents, this geophone being connected by a cable 27 to a transmitter 28, preferably of the type disclosed in my copending application Serial No. 41,337, now Patent 2,479,772, which converts the electrical current into radio waves radiated from an antenna 29. Since the location of the geophones is not limited by a cable connecting them to a recording vehicle, the geophone stations may be disposed at any desirable locations within several miles of the shot point. In the present example, some of the identical geophone units have not been shown on the drawing for purposes of clarity.

A portion of the seismic waves produced by the explosion are propagated along the surface regions of the earth, as indicated at 30, and are measured by the geophones, these waves commonly being referred to as Rayleigh waves or ground roll. Seismic disturbance from the explosion at shot point 20 are also propagated downwardly into the earth, reflected from subterranean strata, and thence travel upwardly to the respective geophone stations, these waves being indicated by the dotted lines 31 traversing the respective earth strata 32, 33, 34, and 35. These waves are also picked up by the respective geophones 26 and cause representative radio waves to be emitted from the antenna 29.

The apparatus at the recording vehicle comprises an antenna 38, preferably of the directive type, which picks up the aforesaid radio signals radiated from antennas 24 and 29. It will be understood that each of the transmitters 23 and 28 is assigned a separate frequency within a predetermined frequency band, for example the 152 to 162 megacycle band, the wave length of adjacent channels in this band normally differing by no more than .25 megacycles. Accordingly, the antenna 38 may be readily designed to function efficiently at all frequencies within the aforesaid frequency band. It is not practical to use many separate receivers each having its own antenna due to difficulties arising from inter-modulation of the separate local oscillators and cross talk between adjacent signals.

The signals picked up by the antenna 38 are fed to an antenna coupling unit 39, and, thence, to a plurality of receivers 40 which are sensitive to signals within restricted frequency bands included in the main predetermined frequency band.

Figure 3:
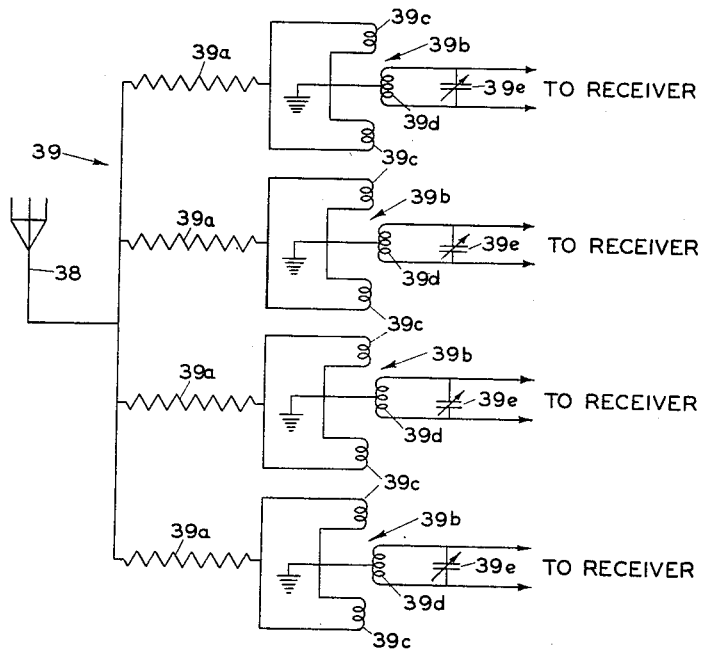
Figure 3 is a schematic circuit diagram of the antenna coupling unit.

The detailed circuit of the antenna coupling unit is shown by Figure 3 in which it will be noted that the antenna 38 is connected by decoupling impedances, such as resistors 39a, to tuned inductive circuits 39b, respectively. Each circuit 39b includes a pair of parallel connected coils 39c which are inductively coupled to the respective coils 39d, each of the latter being tuned by a variable condenser 39e to pass the restricted band of frequencies assigned to the receiver 40 with which the tuned inductance is associated, it being understood that the input circuit of each receiver is connected in parallel with the coil 39d and condenser 39e associated therewith.

Assuming that it is desired to utilize fifteen geophones, it is necessary to provide sixteen frequencies, one for the shot point transmitter and one for each geophone. In the example shown, four receivers are provided for these sixteen frequencies, each receiver being sensitive to and separating four of the transmitted wave lengths, the separated signals then being fed to a common recorder unit 41. As will be apparent from the following description, in some cases, a single receiver may be used to separate all sixteen of the incoming signals or, alternatively, a plurality of receivers may be utilized and each receiver may be assigned to any desired number of transmitter frequencies. The number of channels which may be handled by a single receiver is limited to about twelve for certain of the receivers disclosed herein, although other of the disclosed receivers can accommodate a considerably greater number. The function of the antenna coupling unit 39 is to isolate the input circuits of the respective receivers from each other and thereby prevent interference or inter-modulation between the receivers.

It will be apparent that the described system substitutes a radio or radiant linkage for the cable or conductive linkage previously utilized between the respective geophone stations and the recording unit. Accordingly, it is not necessary to limit the arrangement or spacing of the geophones, as has been previously required by the cable connected apparatus of the prior art. The use of radio linkage overcomes the problems associated with interconnecting cables but creates many new problems which have hitherto prevented operation of a commercial and practical radio geophone system. This invention is directed to the solution of the problems arising in connection with radio linkage on a practical and commercial scale.

The most serious of these problems are cross talk and distortion arising in a multi-channel receiver when it is attempted to separate a number of signals which are closely adjacent in frequency. Cross talk and distortion result from inter-modulation and cross-modulation, these problems being much more serious in the present system than in ordinary communication apparatus where the transfer of intelligence is the primary requirement. Thus, in a radio seismic system, precise intervals of time must be measured with great accuracy. Cross-modulation exists in a circuit when the conditions are such that when two signals of different frequencies are applied, the amplitude of the output of one frequency depends upon the amplitude of the second frequency that is present. When one of these signals is modulated, cross-modulation results in the amplitude of the unmodulated wave depending upon the envelope amplitude of the modulated wave. This causes the modulation of the first wave to be transferred to the second wave. Cross-modulation occurs in an amplifier, mixer, or detector as a result of third-order or higher order action, and is usually only very serious when one attempts to listen to or observe a weak signal in the presence of a strong signal.

Inter-modulation may be present in a circuit carrying two or more signals of appropriate frequencies, when these signals beat together and produce sum and difference frequencies which are passed into the system at a point where some other signal was intended. This can usually only occur in a heterodyne type of receiver, or in a system which has non-linear elements preceding an amplifier tuned to higher or lower frequencies than are permitted at the input. With this type of action, the modulation is transferred from a carrier signal frequency to a sum or difference frequency in a way common to all heterodyne action (interference phenomena). Thus, inter-modulation, as a defect in a system is no different physically from that which occurs in a super-heterodyne receiver as a wanted action. The intermediate frequency is produced through the inter-modulation of a signal frequency with a locally produced current of slightly different frequency. This can of course occur in a variety of ways. The "locally produced" signal may be replaced by a second signal picked up on the antenna along with the wanted signal. In the present system, the antenna is obliged to pick up sixteen or more signals having the minimum possible frequency separation. I have discovered that these problems may be overcome by the use of a single local oscillator to heterodyne all the incoming signals and by the novel mixer and coupling circuits disclosed by Figure 2 and the subsequent figures. The primary object of this invention is to prevent unwanted inter-modulation products from falling into intermediate frequency channels assigned to particular radio geophone stations only and the use of a single local oscillator prevents the intermodulation of signals from the several geophone station transmitters from becoming a serious problem. At the same time, I employ particular kinds of circuits and coil arrangements in the plate circuit of the mixer tube to reduce the possibilities or extent of cross-modulation. I also operate the mixer tube where it has the greatest ratio of second-order to third-order curvature, for the same reason.

Figure 2:
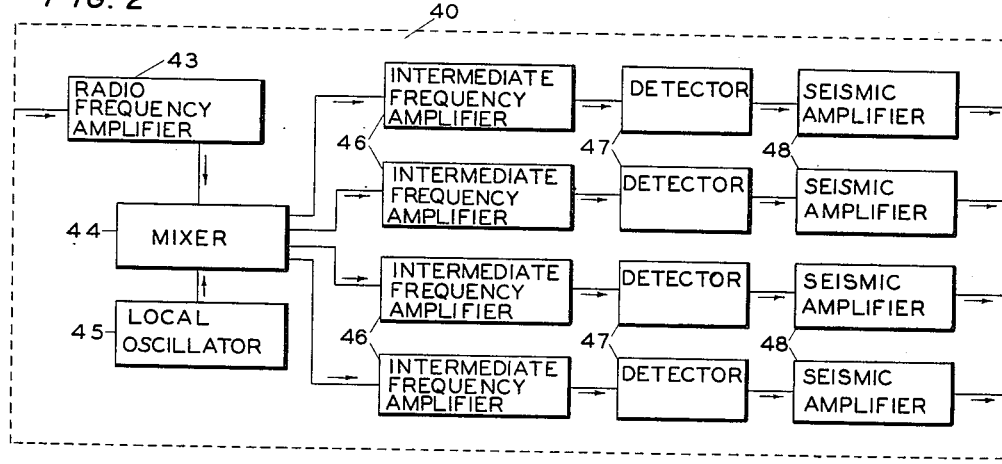
Figure 2 is a block diagram illustrating the novel multi-channel receiving circuit.

Referring now to Figure 2, it will be noted that the receiver 40 comprises a radio frequency amplifier 43 to which radio frequency energy is fed from the antenna 38 and antenna coupling unit 39 of Figure 1. The output of the amplifier 43 is fed to a mixer circuit 44 which also receives the output from a local oscillator 45. In the example shown by Figures 1 and 4, four radio signals, in the very high frequency band, differing by about .25 megacycle in frequency, for example, are fed to the mixer 44 where they are heterodyned with the output signal produced by local oscillator 45. Accordingly, at the output of the mixer circuit 44, there are four heterodyne signals whose frequencies differ by the same amount as the incoming signals. These heterodyne signals are fed to the respective intermediate frequency amplifiers 46, each of which is tuned to the frequency of one of the heterodyne signals produced by the mixing circuit. It will be noted that all the incoming signals pass through radio frequency amplifier 43 and are not separated thereby. This results from the fact that a radio frequency amplifier could not be made sufficiently selective to separate such closely adjacent signals although such selectivity may be obtained, in accordance with the invention, by the intermediate frequency circuits. Furthermore, there will not be any great amount of difficulty experienced from cross-modulation in the radio frequency amplifier since all geophone transmitters will be operating at substantially the same level.

In each channel, the signals produced by the amplifier 46 are fed to a detector 47 and thence to a seismic amplifier unit 48. Following individual amplifier units 48, all signals are fed to a common recorder 41, as shown in Figure 1. The amplifiers 46, 48 and detector 47 are all of conventional construction and, hence, their circuits need not be described in detail. As will be understood by those skilled in the art, the detector 47 converts the intermediate frequency signals from amplifier 46 to audio frequency signals which are further amplified by the seismic amplifier 48 and utilized to operate a moving coil galvanometer controlling a small mirror which acts, through a suitable optical system, to form a record upon a motor driven strip of photographic paper. Preferably, the recorder units all produce a record upon a single sheet of photographic paper and the common recorder unit includes a group of galvanometer coils, one of which is fed by each of the seismic amplifier units.

It is a feature of the invention that all the incoming signals fed to the mixer circuit are heterodyned with the output of a single local oscillator. This effectively prevents the introduction of unwanted inter-modulation components into the intermediate frequency amplifiers and the following portions of the circuit. As previously stated, the incoming signals are separated by a small frequency difference, which may be of about .25 megacycle out of approximately 152 megacycles. The frequency of the local oscillator 45 is so determined that the heterodyne or beat signals produced have a frequency much higher than the frequency difference between the incoming signals. In the present example, the heterodyne difference frequencies may be in the neighborhood of 5 megacycles and the input circuits of the intermediate frequency amplifiers, of course, are tuned to the respective heterodyne frequencies. As a result, the components produced by inter-modulation of the incoming signals vary from about .25 megacycle to about 1 megacycle and the signals having such frequencies are easily excluded from the intermediate frequency input circuits which have a resonant frequency in the neighborhood of about 5 megacycles. This would not be true if several beat oscillators were used in accordance with prior practice in multi-channel receivers. The local oscillator of one receiver beats with the signals entering another, and in a multi-channel system, such as the one required by a seismograph system, so many frequencies are produced that invariably unwanted signals will fall in intermediate frequency channels assigned to particular signal frequencies. In a confined space, and using a continuous portion of the radio spectrum, it is virtually impossible to localize the action of more than a few oscillators to the receivers of which they properly form a part. Particularly is this true when the several receivers are obliged to use one or more common facilities. In a radio seismograph system, there are of necessity several common facilities, such as the antenna, primary power supply, recorder, and ground.

By choosing the beat oscillator frequency and signal frequencies in the manner stated, higher order difference frequencies are substantially eliminated from the input circuits of the intermediate frequency amplifiers 46. It can be shown mathematically for the frequencies considered in the foregoing examples that only difference frequencies of approximately the twentieth order or greater have the proper frequency to enter the intermediate frequency amplifiers. The amplitude at these frequencies is so small as to be negligible and, indeed, the production of any higher order difference frequencies can be substantially eliminated by providing a mixer tube having a substantially parabolic characteristic, that is, a tube having low curvature of the third and higher orders, as compared to second order curvature. This also substantially reduces the extent of cross-modulation. It is also desirable that the tuned anode circuit of the mixer be tuned as sharply as possible without unduly attenuating any of the band of frequencies passed thereby and that the internal impedance of the mixer circuit shall be high as compared to the overall impedance of the tuned anode circuit, in order to minimize cross-modulation.

A practical set of selectivity characteristics for a four channel receiver is shown by Figure 9 in which the abscissa represents frequency in megacycles and the ordinate represents amplification, the selectivity curves of the respective intermediate frequency amplifiers being indicated by 49, 50, 51, and 52. Assume, as a particular example, that the intermediate frequency amplifiers are resonated about the frequencies:

$f_a = f_x - f_1 = 4.94$ mc.    $f_c = g_x - f_3 = 5.42$ mc.
$f_b = f_x - f_2 = 5.18$ mc.    $f_d = f_x - f_4 = 5.66$ mc.

where $f_a$, $f_b$, $f_c$, $f_d$ represent the respective heterodyne frequencies, $f_x$ represents the beat oscillator frequency, and $f_1$, $f_2$, $f_3$, $f_4$ represent the frequencies of the incoming signals. Then the intermediate frequency band width 53 at the 6 decibel point is approximately .06 megacycle, while the selective channel discrimination 54 is at least 55 decibels. Selectivity curves of the type shown are obtained in a double-tuned three-stage intermediate frequency amplifier using coils having a Q of approximately 100.

Figure 4:
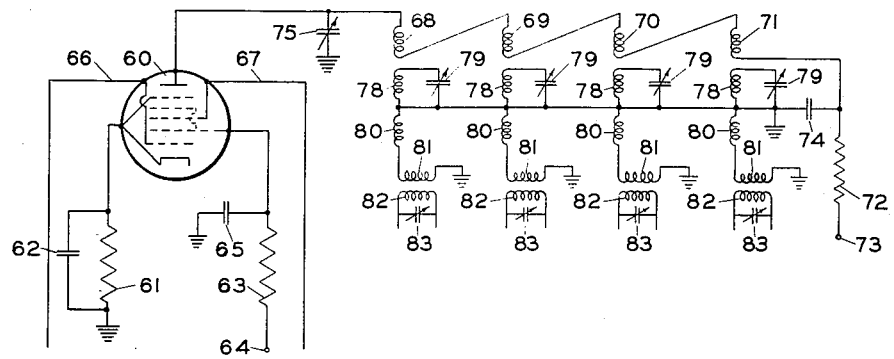

Referring now to Figure 4, I have illustrated a novel coupling circuit. In this figure, the mixer circuit includes pentagrid tube 60 having its cathode and suppressor grid interconnected, the junction therebetween leading through a bias resistor 61 to ground. The resistor 61 is shunted by a by-pass condenser 62. The screen grid of the tube 60 is connected to a grounded by-pass condenser 65 and through a resistor 63 to a positive power supply terminal 64. The tube 60 also includes two control grids, one of which is connected by a lead 66 to the output of local oscillator 45, which has a conventional circuit and, hence, is not described in detail. The other control grid of tube 60 is connected by a lead 67 to the output of radio frequency amplifier 43.

As those skilled in the art will understand, the incoming signals from radio frequency amplifier 43 are mixed with the output of local oscillator 45 and heterodyne signals appear in the anode-cathode circuit of the tube, the frequency of these signals being equal, respectively, to the difference between the local oscillator frequency and the incoming signal frequencies.

The anode of tube 60 is connected through four series connected inductances 68, 69, 70, and 71 to a resistor 72 which, in turn, is connected to a positive power supply terminal 73 and a by-pass condenser 74 is connected between the first-mentioned portion of resistor 72 and ground. A tuning condenser 75 is connected between the anode of tube 60 and ground, and this condenser together with the inductances 68, 69, 70, and 71 constitute a circuit which is broadly tuned to cover the band of frequencies assigned to the receiver 40. Accordingly, the heterodyne signals from tube 60 appear across each of said inductances. Associated with each of the inductances 68 to 71, inclusive, is a unit including an inductor 78 which is shunted by a tuning condenser 79, a low impedance link comprising two interconnected coils 80, 81 and an intermediate frequency input circuit comprising input coil 82 which is shunted by a condenser 83.

In accordance with my invention, the coupling between the coils 78, 80 of each unit is very close, that is, the mutual inductance between these coils is relatively very great whereas the mutual inductance between the coils 68, 78 of each unit is considerably less although it is still substantially greater than the mutual inductances existing between the coils 68, 78, 80 of each such unit and any other of the coils in the coupling system, respectively. As a result, on one hand, the coils 78 are effectively isolated from each other. On the other hand, coupling between coils 78 and 80 may be very close so that efficient transfer of energy is made and so that the intermediate frequency input circuits may be sufficiently selective as to obtain the desired band pass characteristics. With the circuit shown, an attenuation network or low impedance filter may be placed in the link 80, 81 to provide further isolation between the respective intermediate frequency circuits.

The use of the low impedance link 80, 81 is made necessary by the fact that there is considerable physical separation between the mixer tube 60 and the several intermediate frequency stages. The use of such link coupling has the double function of isolating the respective intermediate frequency input circuits and permitting proper physical separation of the mixer and intermediate frequency amplifier stages upon the chassis of the receiver. In some cases, however, the link may be omitted and the inductances 68, 69, 70, and 71 may be coupled directly to the intermediate frequency input circuits. Further, there are two tuned circuits between the output of the mixer tube and the input to each intermediate frequency stages which substantially aids in obtaining increased selectivity. In this connection, it will be understood that the tuned circuits 78, 79 and 82, 83 of each unit are tuned to the same frequency whereas the respective units are tuned to the different intermediate frequencies within the band passed by the circuits 75, 68.

Figure 5:
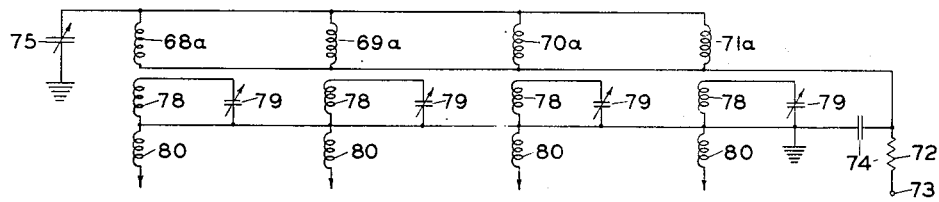
Figure 6:
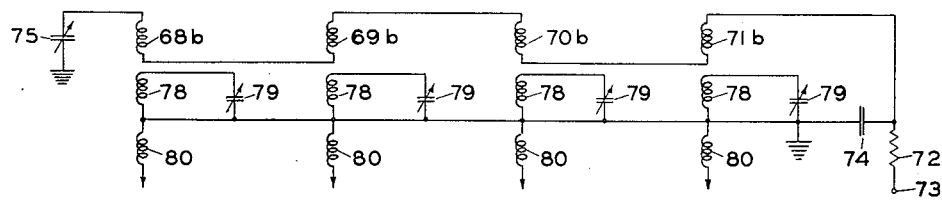
Figure 7:
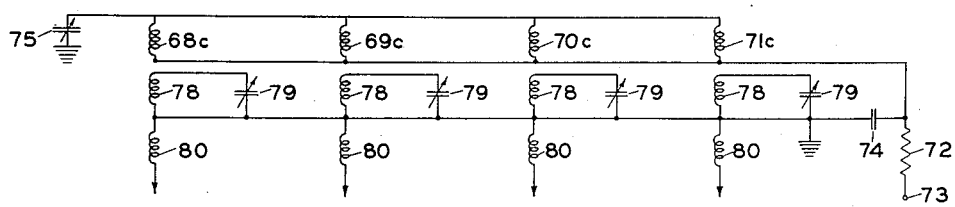

In Figures 5 to 7, inclusive, I have shown modifications of my novel coupling circuit and parts similar to those already described are indicated by like reference characters. In the circuit of Figure 5, the inductances 68 to 71, inclusive, are replaced by inductances 68a to 71a, inclusive, which are connected in parallel instead of in series. In addition, the coils 69a, 71a are wound in reverse direction with respect to the coils 68a and 70a.

In the circuit of Figure 6, the inductances 68 to 71, inclusive, are replaced by inductances 68b to 71b, inclusive, which are connected in series. Whereas, in Figure 4, the low potential end of each inductance 68, 69, 70, and 71 is positioned adjacent the high potential end of coil 78, in Figure 6, the low potential end of coils 68b and 71b is positioned adjacent the high potential end of the coils 78 associated therewith and the high potential end of coils 69b and 70b are positioned adjacent the high potential end of the coils 78 associated therewith.

In Figure 7, the arrangement of the coils is similar to that of Figure 5 except that the inductances 68c, 69c, 70c, and 71c are all wound in the same direction. All these methods of connecting the plate inductances of mixer 60 are considered equivalent and produce results comparable to the circuit shown by Figure 4, provided that the inductance relations set forth in connection with that circuit are observed.

In Figure 8, I have illustrated a modified mixer circuit in which two triodes connected in push-pull circuit arrangement are utilized instead of a pentagrid converter 60. This system has the advantage that all odd order difference frequencies are cancelled out regardless of the linearity or lack of linearity of the tube characteristics. In this circuit, I utilize two triodes 85, 86, the control grids of which are connected through inductances 87 and 88, respectively, to a terminal 89, the inductances 87, 88 receiving the output of the radio frequency amplifier 43, Figure 2. Connected between the terminal 89 and a grounded terminal 90 is the output of a suitable local oscillator which provides the signal for heterodyning the incoming radio frequency signals. The cathodes of triodes 85, 86 are grounded and the anode of tube 85 is connected through series inductances 91, 92 and 93 to a positive power supply terminal 94 while the anode of tube 86 is connected through series inductances 95, 96 and 97 to terminal 94.

Associated with the set of coils 93, 97, is a unit including coils 98, 99 which are coupled to the respective inductances 93, 97, and which are connected in circuit with a condenser 100. A low impedance link comprising coils 101, 102 is coupled to the coils 98, 99, respectively, and this link is connected to the input circuit of an intermediate frequency amplifier in the manner described in connection with Figure 4. A similar arrangement is provided for the set of inductances 92, 96 and the set of inductances 91 and 95. Although only three channels are shown in this circuit, it is to be understood that four or any other suitable number may be utilized.

It will be apparent that the incoming signals appearing across coils 87, 88 are heterodyned with the output of the local oscillator, the heterodyne signals appearing in the anode circuits of the triodes 85 and 86. The respective units, each comprising circuit components 98, 99, 100, 101, and 102, are tuned to different frequencies within the band passed by the input circuits of the receiver and thence are fed to the intermediate frequency amplifiers shown by Figure 2. In this circuit, the inductance relationships noted in connection with Figures 4 to 7, inclusive, are observed. For example, the mutual inductance between coils 98, 101 and 99, 102 is substantially greater than the mutual inductance between coils 93, 98 and 97, 99 which, in turn, is substantially greater than the coupling between each of the coils 93, 97, 98, 99, 101, 102 and any other coil in the system. The push-pull circuit arrangement is very advantageous in reducing the chances of inter-modulation by elimination of odd order difference frequencies in the output of the mixer.

The aforementioned relationships between the mutual inductances of the coils in the coupling units are obtained, in accordance with the invention, by the use of the novel intermediate frequency transformer structure shown by Figure 10. This structure comprises a base plate 105 and a top plate 106 which are separated and secured in assembled relation by spacers 107. A plurality of coil forms 108, one for each channel, are suitably supported between the top and bottom plates 105 and 106. These forms are made of insulating material and carry the respective plate inductances 68, 69, 70, and 71 shown by Figures 4 to 7, inclusive. Also mounted upon each coil form 108 is the tuned inductor coil 78 and the low impedance link coil 80. It will be apparent that the coils 78, 80 are much more closely spaced than the coils 68 and 78. As a result, the mutual inductance between coils 78 and 80 is substantially greater than the mutual inductance between coils 68 and 78, which, in turn, is substantially greater than the mutual inductance between coils 68 and 80. Likewise, any of these mutual inductances is substantially greater than that existing between coils on adjoining forms. If desired, shielding may be utilized between the coil forms 108 to further decrease the mutual inductance between different coil units.

The inductance 78 may advantageously be tuned by an iron core 109 which is movable axially within the form 108 by a rod or shaft 110 suitably journaled in top plate 106. Alternatively, the tuning of inductance 78 may be varied by a condenser, such as that shown by 79 in Figures 4 to 7, inclusive. The described intermediate coil structure is very advantageous in reducing the coupling between the respective intermediate frequency amplifiers.

A further important modification of this invention is shown by Figure 12 which is a block diagram of a multi-channel receiver embodying a plurality of mixing circuits connected in cascade. The coupling between the various circuits may be provided in the manner shown by the circuit diagrams of Figures 4 to 7, inclusive, as those skilled in the art will readily understand. In this receiver, a broad band of radio frequencies is picked up by an antenna 112 from which the signals are fed to a radio frequency amplifier 113 and thence to a mixing circuit 114. The output from a first local oscillator 115 is fed to the mixing circuit 114 which may advantageously utilize the circuit of Figure 4, with the modification that a considerably broader tuned circuit is substituted, so that a large number of signals covering a relatively broad frequency band are passed by the radio frequency amplifier 113 and mixer 114.

In the mixing circuit 114, the incoming radio signals are heterodyned with the output of the local oscillator 115 thereby to produce groups of heterodyne signals occupying restricted frequency bands within the aforesaid broad frequency band. The intermediate frequency amplifiers indicated at 116 are tuned so as to pass their respective restricted frequency bands and to reject other signals. In Figure 13, the curves 117, 118 and 119 represent the frequencies passed by three of the amplifiers 116. The output of each intermediate frequency amplifier 116 is fed to a mixer 123 to which is applied the output of a second local oscillator 124. Although only one mixer 123 and local oscillator 124 are shown by Figure 12, it will be understood that a similar unit is associated with each of the other intermediate frequency amplifiers 116. The signals within each restricted band are heterodyned with the output of local oscillator 124 and the resultant signals are fed to second intermediate frequency amplifiers 125, one of which is tuned to each signal present within the restricted frequency band fed to the associated amplifier 116. The second intermediate frequencies are preferably substantially lower than the first intermediate frequencies and, hence, the former circuits may be made considerably more selective. These second heterodyne frequencies are represented by the lines 126, 127 and 128 in Figure 13. From this figure, it will be apparent that it is immaterial if a portion of the signals 127 are picked up by the intermediate frequency amplifier provided for signals 126. This results from the fact that such unwanted signals will be rejected by the sharply tuned intermediate frequency amplifiers 125.

By the use of the described double heterodyne arrangement, an extremely large number of signals may be handled by a single multi-channel receiver unit. Referring to Figure 1, the receiver of Figure 12 may be directly coupled to antenna 38 with resultant elimination of antenna coupling unit 39 and three of the receivers 40. It will be apparent that the receiver shown by Figure 12 provides a simple apparatus for selectively separating and amplifying a multiplicity of modulated radio waves arranged in a compact system in the frequency spectrum.

It will be apparent that I have disclosed a complete radio geophone system in which inter-modulation has been substantially eliminated by my novel mixer and coupling circuits, and in which the possible effects of cross-modulation have been avoided by utilizing only a single beat or local oscillator for a multiplicity of frequency conversions. Unwanted inter-modulation signals are either not produced or are efficiently suppressed and, by the use of the link coupling networks, the signals in the respective channels are effectively isolated at the beginning. The decoupling circuits require the use of unique inductance relationships between the coils of the respective coupling units, which inductance relations are readily obtainable by the use of the disclosed intermediate frequency coupling transformer. Finally, I have disclosed a cascade mixer circuit whereby an extremely large number of closely adjacent signals are separated by a single receiver.

While the invention has been described in connection with a present, preferred embodiment thereof, it is to be understood that this description is illustrative only and is not intended to limit the invention, the scope of which is defined by the appended claims.

Having described my invention, I claim:

1. In a multi-channel radio receiving circuit, an oscillator, input circuit means for receiving a plurality of radio signals within a predetermined frequency band, a mixing circuit for heterodyning said signals with the output signal produced by said oscillator, said mixing circuit having an output portion which includes a plurality of inductance coils with relatively low mutual inductance therebetween, a single tuning condenser connected in circuit with said plurality of inductance coils to form a broadly tuned circuit which is resonant to a band of heterodyne frequencies produced by the interaction of the local oscillator signal with radio signals within said predetermined frequency band, a plurality of intermediate frequency input circuits each including an input coil coupled to one of said inductance coils so as to provide a relatively high mutual inductance therebetween, and means for tuning each input coil to one of the heterodyne frequencies produced by said mixing circuit.

2. In a multi-channel radio receiving circuit, an oscillator, input circuit means for receiving a plurality of radio signals within a predetermined frequency band, a mixing circuit for heterodyning said signals with the output signal produced by said oscillator to produce a band of intermediate frequency signals, said mixing circuit having an output portion which includes a plurality of inductance coils with relatively low mutual inductance therebetween, means for tuning said inductance coils so that they selectively pass signals within said intermediate frequency band, said tuning means including a single tuning condenser connected in circuit with all of said coils to form a broadly tuned circuit, a plurality of intermediate frequency input circuits each including an input coil coupled to one of said inductance coils so as to provide a relatively high mutual inductance therebetween, and means for tuning each input coil to one of the intermediate frequency signals produced by said mixing circuit.

3. In a multi-channel radio receiving circuit, an oscillator, a mixer tube having an anode, a cathode and a plurality of control grids, means for impressing the output of the oscillator on one of said control grids, an input circuit for impressing a plurality of radio signals within a predetermined frequency band upon another of said control grids whereby said signals are heterodyned with the output of said oscillator, the anode circuit of said mixer tube including a plurality of inductance coils with relatively low mutual inductance therebetween, a single tuning condenser connected in circuit with said plurality of inductance coils to form a broadly tuned circuit which is resonant to a band of heterodyne frequencies produced by the interaction of the local oscillator signal with radio signals within said predetermined frequency band, a plurality of intermediate frequency input circuits each including an input coil coupled to one of said inductance coils so as to provide a relatively high mutual inductance therebetween, and means for tuning each input coil to one of the heterodyne frequencies produced by said mixing circuit.

4. In a multi-channel radio receiving circuit, an oscillator, a mixer tube having an anode, a cathode and a plurality of control grids, means for impressing the output of the oscillator on one of said control grids, an input circuit for impressing a plurality of radio signals within a predetermined frequency band, upon another of said control grids whereby said signals are heterodyned with the output of said oscillator to produce a band of intermediate frequency signals, the anode circuit of said mixer tube including a plurality of inductance coils with relatively low mutual inductance therebetween, means for tuning said inductance coils so that they selectively pass signals within said intermediate frequency band, said tuning means including a single tuning condenser connected in circuit with all of said coils to form a broadly tuned circuit, a plurality of intermediate frequency input circuits each including an input coil coupled to one of said inductance coils so as to provide a relatively high mutual inductance therebetween, and means for tuning each input coil to one of the heterodyne frequencies produced by said mixing circuit.

5. In a multi-channel radio receiving circuit, an oscillator, input circuit means for receiving a plurality of radio signals within a predetermined frequency band, a mixing circuit comprising a pair of electron tubes connected in push-pull circuit arrangement, means for impressing said radio signals and the output of said oscillator upon the control grids of both electron tubes, a plurality of sets of inductance coils connected in the anode circuits of said electron tubes, each set including an inductance coil in the anode circuit of each tube, a plurality of intermediate frequency input circuits, each tuned to a different frequency within said band, and means inductively coupling each set of inductance coils to one of said input circuits.

6. In a multi-channel radio receiving circuit, an oscillator, input circuit means for receiving a plurality of radio signals within a predetermined frequency band, a mixing circuit comprising a pair of electron tubes connected in push-pull circuit arrangement, means for impressing the output of said oscillator and said radio signals upon the control grids of both electron tubes, a plurality of sets of inductance coils connected to the anodes of said electron tubes, each set including an inductance coil in the anode circuit of each tube, a tuned circuit coupled to each set of inductance coils, and a low impedance link coupled to each tuned circuit, said link being coupled to an intermediate frequency amplifier.

7. In a multi-channel radio receiving circuit, an oscillator, input circuit means for receiving a plurality of radio signals within a predetermined frequency band, a mixing circuit comprising a pair of electron tubes connected in push-pull circuit arrangement, means for impressing the output of said oscillator and said radio signals upon the control grids of both electron tubes, a plurality of sets of inductance coils connected to the anodes of said electron tubes, each set including an inductance coil in the anode circuit of each tube, a tuned circuit coupled to each set of inductance coils, and a low impedance link coupled to each tuned circuit, the mutual inductance between each tuned circuit and its associated link being substantially greater than the mutual inductance between each tuned circuit and its associated set of inductance coils.

8. In a multi-channel radio receiving circuit, an oscillator, input circuit means for receiving a plurality of radio signals within a predetermined frequency band, a mixing circuit for heterodyning said signals with the output signal produced by said oscillator, said mixing circuit having an output portion which includes a plurality of inductance coils with relatively low mutual inductance therebetween, a single tuning condenser connected in circuit with all of said inductance coils to form a broadly tuned circuit responsive to the frequency band produced by the heterodyning of said plurality of radio signals with said local oscillator signals, a unit associated with each inductance coil including an inductor coupled to said coil and tuned to a frequency within said band, an intermediate frequency input circuit tuned to said frequency, and a low impedance link coupling said inductor and said input circuit.

9. In a multi-channel radio receiving circuit, an oscillator, a mixer tube having an anode, a cathode and a plurality of control grids, means for impressing the output of the oscillator on one of said control grids, an input circuit for impressing a plurality of radio signals within a predetermined frequency band upon another of said control grids whereby said signals are heterodyned with the output of said oscillator, the anode circuit of said mixer tube including a plurality of inductance coils with relatively low mutual inductance therebetween, a single tuning condenser connected in circuit with said inductance coils to form a broadly tuned circuit responsive to heterodyne signals produced by the interaction of said radio signals with the output of said oscillator, a unit associated with each inductance coil including an inductor coupled to said coil and tuned to a frequency within said band, an intermediate frequency input circuit tuned to said frequency, and a low impedance link coupling said inductor and said input circuit, the mutual inductance between said link and said inductor being substantially higher than the mutual inductance between said inductor and its associated inductance coil which, in turn, is substantially higher than the mutual inductance between the inductances of said unit and any other of the inductances of said circuit.

10. In a multi-channel radio receiving circuit, an oscillator, a mixer tube having an anode, a cathode and a plurality of control grids, means for impressing the output of the oscillator on one of said control grids, an input circuit for impressing a plurality of radio signals within a predetermined frequency band upon another of said control grids whereby said signals are heterodyned with the output of said oscillator, the anode circuit of said mixer tube including a plurality of inductance coils with relatively low mutual inductance therebetween, a single tuning condenser connected in circuit with said inductance coils to form a broadly tuned circuit responsive to heterodyne signals produced by the interaction of said radio signals with the output of said oscillator, an inductor coupled to each coil so that the low potential end of certain of said inductances is adjacent the high potential end of the associated inductors while the high potential end of the remainder of said inductances is adjacent the high potential end of the associated inductors, means for tuning each inductor to a different frequency within said band, an intermediate frequency input circuit tuned to each different frequency, and a low impedance link coupling each inductor to its associated input circuit.

11. In a multi-channel radio receiving circuit, an oscillator, a mixer tube having an anode, a cathode and a plurality of control grids, means for impressing the output of the oscillator on one of said control grids, an input circuit for impressing a plurality of radio signals within a predetermined frequency band upon another of said control grids whereby said signals are heterodyned with the output of said oscillator to produce a band of intermediate frequency signals, the anode circuit of said mixer tube including a plurality of inductance coils with relatively low mutual inductance therebetween, a single tuning condenser connected in circuit with said inductance coils to form a broadly tuned circuit responsive to heterodyne signals produced by the interaction of said radio signals with the output of said oscillator, an inductor coupled to said each inductance coil so that the low potential end of each inductance coil is adjacent the high potential end of the inductor associated therewith, means for tuning each inductor to a different frequency within said band, an intermediate frequency input circuit tuned to each different frequency, and a low impedance link coupling each inductor to its associated input circuit.

12. In a multi-channel radio receiving circuit, an oscillator, a mixer tube having an anode, a cathode and a plurality of control grids, means for impressing the output of the oscillator on one of said control grids, an input circuit for impressing a plurality of radio signals within a predetermined frequency band upon another of said control grids whereby said signals are heterodyned with the output of said oscillator to produce a band of intermediate frequency signals, the anode circuit of said mixer tube including a plurality of inductance coils with relatively low mutual inductance therebetween, a single tuning condenser connected in circuit with said inductance coils to form a broadly tuned circuit responsive to heterodyne signals produced by the interaction of said radio signals with the output of said oscillator, an inductor coupled to each coil and wound in the same direction as said coil, means for tuning each inductor to a different frequency within said band, an intermediate frequency input circuit tuned to each different frequency, and a low impedance link coupling each inductor to its associated input circuit.

13. In a multi-channel radio receiving circuit, an oscillator, a mixer tube having an anode, a cathode and a plurality of control grids, means for impressing the output of the oscillator on one of said control grids, an input circuit for impressing a plurality of radio signals within a predetermined frequency band upon another of said control grids whereby said signals are heterodyned with the output of said oscillator to produce a band of intermediate frequency signals, the anode circuit of said mixer tube including a plurality of inductance coils with relatively low mutual inductance therebetween, a single tuning condenser connected in circuit with said inductance coils to form a broadly tuned circuit responsive to heterodyne signals produced by the interaction of said radio signals with the output of said oscillator, an inductor coupled to each coil, certain of said inductors being wound in the same direction as the coils associated therewith, and the rest of said inductors being wound in opposite direction with respect to the coils associated therewith, means for tuning each inductor to a different frequency within said band, an intermediate frequency input circuit tuned to each different frequency, and a low-impedance link coupling each inductor to its associated input circuit.

14. A radio seismograph system comprising firing means at a shot point for setting off an explosive charge in the earth, a plurality of geophones responsive to the waves produced in the earth by an explosion at the shot point, a transmitter actuated by said firing means, a transmitter actuated by each of said geophones, all of said transmitters being tuned to different radio frequencies, and a multi-channel receiving set sensitive to all the radio waves produced by said transmitters comprising a common antenna, means for amplifying the signals received by said antenna, means for heterodyning all the amplified signals with a signal produced by a single local oscillator thereby to produce a plurality of heterodyne signals, said heterodyning means including an output circuit having a plurality of inductance coils with relatively low mutual inductance therebetween, a single condenser for broadly tuning all of said coils to the frequency range of said heterodyne signals, intermediate frequency amplifiers for separately amplifying the respective heterodyne signals, each amplifier including an input coil coupled to one of said inductance coils so as to provide a relatively high mutual inductance therebetween, means for tuning each input coil to one of the heterodyne frequencies produced by said mixing circuit, a detector unit fed by each intermediate frequency amplifier, and means for recording the output of each detector unit.

15. A radio seismograph system comprising firing means at a shot point for setting off an explosive charge in the earth, a plurality of geophones responsive to the waves produced in the earth by an explosion at the shot point, a transmitter actuated by each of said geophones, all of said transmitters being tuned to different radio frequencies, and a multi-channel receiving set sensitive to all of the radio waves produced by said transmitters comprising a common antenna constituting input circuit means for receiving a plurality of radio signals within a predetermined frequency band, an oscillator, a mixing circuit for heterodyning said signals with the output signal produced by said oscillator, said mixing circuit having an output portion which includes a plurality of inductance coils with relatively low mutual inductance therebetween, a single tuning condenser connected in circuit with said plurality of inductance coils to form a broadly tuned circuit which is resonant to a band of heterodyne frequencies produced by the interaction of the local oscillator signal with radio signals within said predetermined frequency band, a plurality of intermediate frequency input circuits each including an input coil coupled to one of said inductance coils so as to provide a relatively high mutual inductance therebetween, means for tuning each input coil to one of the heterodyne frequencies produced by said mixing circuit, a plurality of intermediate amplifiers having their inputs connected to the respective intermediate frequency input circuits, a detector unit fed by each intermediate frequency amplifier, and means for recording the output of each detector unit.

16. A radio seismograph system comprising firing means at a shot point for setting off an explosive charge in the earth, a plurality of geophones responsive to the waves produced in the earth by an explosion at the shot point, a transmitter actuated by each of said geophones, all of said transmitters being tuned to different radio frequencies, and a multi-channel receiving set sensitive to all of the radio waves produced by said transmitters comprising a common antenna constituting input circuit means for receiving a plurality of radio signals within a predetermined frequency band, an oscillator, a mixing circuit for heterodyning said signals with the output signal produced by said oscillator, said mixing circuit having an output portion which includes a plurality of inductance coils with relatively low mutual inductance therebetween, a single tuning condenser connected in circuit with said plurality of inductance coils to form a broadly tuned circuit which is resonant to a band of heterodyne frequencies produced by the interaction of the local oscillator signal with radio signals within said predetermined frequency band, a plurality of intermediate frequency input circuits each including an input coil coupled to one of said inductance coils so as to provide a relatively high mutual inductance therebetween, means for tuning each input coil to one of the heterodyne frequencies produced by said mixing circuit, a plurality of intermediate frequency amplifiers connected to the respective intermediate frequency input circuits, a local oscillator for each intermediate frequency amplifier, second mixing circuits each connected to the output of one of said intermediate frequency amplifiers and to one of said last-mentioned oscillators to heterodyne the output of the intermediate frequency amplifier with the oscillator signal, whereby second heterodyne signals are produced, and sharply tuned intermediate frequency amplifiers having their input circuits connected to the respective last-mentioned mixing circuits.

References Cited in the file of this patent

UNITED STATES PATENTS

| Number | Name | Date |
|---|---|---|
| 1,361,488 | Osborne | Dec. 7, 1920 |
| 1,518,495 | Espenchied | Dec. 9, 1924 |
| 1,676,244 | Blackwell | July 10, 1928 |
| 1,974,896 | Runge | Sept. 25, 1934 |
| 2,028,212 | Heising | Jan. 21, 1936 |
| 2,056,607 | Holmes | Oct. 6, 1936 |
| 2,072,527 | Nicolson | Mar. 2, 1937 |
| 2,073,454 | Peterson et al. | Mar. 9, 1937 |
| 2,088,432 | Peterson | July 27, 1937 |
| 2,100,606 | Lowell | Nov. 30, 1937 |
| 2,153,052 | Rodwin | Apr. 4, 1939 |
| 2,164,745 | Kentner | July 4, 1939 |
| 2,212,988 | Kirk | Aug. 7, 1940 |
| 2,265,513 | Burg | Dec. 9, 1941 |
| 2,266,496 | Hagen | Dec. 16, 1941 |
| 2,291,779 | Welty | Aug. 4, 1942 |
| 2,296,107 | Kimball | Sept. 15, 1942 |
| 2,298,409 | Peterson | Oct. 13, 1942 |
| 2,343,101 | Vogt | Feb. 29, 1944 |
| 2,354,365 | Crosley | July 25, 1944 |
| 2,378,299 | Hilferty | June 12, 1945 |
| 2,407,308 | Lorenzen et al. | Sept. 10, 1946 |
| 2,433,343 | Chatterjea et al. | Dec. 30, 1947 |
| 2,479,772 | Peterson | Aug. 23, 1949 |
| 2,494,370 | Swartzel et al. | Jan. 10, 1950 |
| 2,609,438 | Winterhalter | Sept. 2, 1952 |

OTHER REFERENCES

Radio Engineering, 3rd ed., Terman, page 528.